United States Patent
Wu

(10) Patent No.: US 8,626,318 B2
(45) Date of Patent: Jan. 7, 2014

(54) LAMP DEVICE

(75) Inventor: Chih-Yen Wu, Taipei (TW)

(73) Assignees: Lite-On Electronics (Guangzhou) Limited, Guangzhou (CN); Lite-On Technology Corp., Taipei (TW)

(*) Notice: Subject to any disclaimer, the term of this patent is extended or adjusted under 35 U.S.C. 154(b) by 255 days.

(21) Appl. No.: 13/187,662

(22) Filed: Jul. 21, 2011

(65) Prior Publication Data

US 2012/0215325 A1    Aug. 23, 2012

(30) Foreign Application Priority Data

Feb. 18, 2011  (CN) .......................... 2011 1 0041733

(51) Int. Cl.
*G05B 11/01* (2006.01)

(52) U.S. Cl.
USPC ............................... 700/11; 315/113; 362/86

(58) Field of Classification Search
USPC ................. 700/11; 315/113; 362/86
See application file for complete search history.

(56) References Cited

U.S. PATENT DOCUMENTS

| | | | |
|---|---|---|---|
| 2003/0179578 A1* | 9/2003 | Albert et al. | 362/276 |
| 2005/0116179 A1* | 6/2005 | Aguirre et al. | 250/492.1 |
| 2005/0185398 A1* | 8/2005 | Scannell, Jr. | 362/227 |
| 2007/0228999 A1* | 10/2007 | Kit | 315/291 |
| 2007/0230197 A1* | 10/2007 | Scannell, Jr. | 362/418 |
| 2007/0268687 A1* | 11/2007 | Scannell, Jr. | 362/154 |
| 2007/0273290 A1* | 11/2007 | Ashdown et al. | 315/113 |
| 2009/0073694 A1* | 3/2009 | Scannell, Jr. | 362/253 |
| 2009/0196016 A1* | 8/2009 | Massara et al. | 362/86 |
| 2010/0096993 A1* | 4/2010 | Ashdown et al. | 315/113 |

* cited by examiner

*Primary Examiner* — Mohammad Ali
*Assistant Examiner* — Anthony Whittington
(74) *Attorney, Agent, or Firm* — Rosenberg, Klein & Lee

(57) ABSTRACT

A lamp device is controllable by a control terminal, and includes a light-emitting module, a driving circuit for driving the light-emitting module, a control unit for controlling duty cycle of the driving circuit, a first connector electrically coupled to the control unit, and a communication module. The communication module includes a second connector pluggably coupled to the first connector. The communication module is adapted to receive a control command from the control terminal and transmits the control command to the control unit via the first and second connectors, such that the control unit controls the driving circuit in accordance with the control command.

11 Claims, 3 Drawing Sheets

LAMP DEVICE

CROSS-REFERENCE TO RELATED APPLICATION

This application claims priority of Chinese Application No. 201110041733.6, filed on Feb. 18, 2011.

BACKGROUND OF THE INVENTION

1. Field of the Invention

The present invention relates to a lamp device, more particularly to a lamp device with an interchangeable communication module.

2. Description of the Related Art

Currently, light-emitting diode (LED) lamp devices have be come more popular owing to maturity of technology. Advantages of the LED lamp device, such as long service time and high controllability, encourages communication control technology for lamp devices, such as infrared, Zigbee, Digital Addressable Lighting Interface (DALI), or power line, to flourishingly develop. A controller of a conventional LED lamp device may wiredly or wirelessly communicate with a control terminal through a communication interface, so as to control luminance and color temperature of a LED lamp in the LED lamp device in accordance with a control command from the control terminal. However, the communication interface and the controller of the conventional LED lamp device are usually inseparably disposed (or disposed on the same circuit board). Therefore, when a user wants to adopt a new communication protocol for controlling the LED lamp device (i.e., to change a way for communication with the control terminal) the user has to replace the whole LED lamp device since the communication interface and the controller of the LED lamp device are inseparable and since firmware for configuring the controller is incompatible with the new communication protocol. It will cost the user a lot of money to replace the whole LED lamp device, and it is a waste of resources to replace the LED lamp device which is still usable especially in view of environmental protection awareness.

SUMMARY OF THE INVENTION

Therefore, an object of the present invention is to provide a lamp device that is compatible with different communication protocols by merely replacing communication interfaces thereof.

Accordingly, a lamp device of the present invention is controllable by a control terminal. The lamp device includes a light-emitting module, a driving circuit, a control unit, a first connector and a communication module. The driving circuit is electrically coupled to the light-emitting module for driving the light-emitting module. The control unit is electrically coupled to the driving circuit for controlling duty cycle of the driving circuit. The first connector is electrically coupled to the control unit. The communication module includes a second connector pluggably coupled to the first connector. The communication module is adapted to receive a control command from the control terminal and transmits the control command to the control unit via the first and second connectors, such that the control unit controls the driving circuit in accordance with the control command. The communication module stores a communication module type to which the communication module belongs and a firmware corresponding to the communication module type stored in the communication module. The firmware includes instructions for executing the control command so as to generate a pulse-width modulation signal for controlling the driving circuit.

The control unit is configured with a firmware set corresponding to different communication module types.

When the second connector of the communication module is electrically coupled to the first connector, the communication module is configured to send a notification signal for notifying the control unit, and the control unit sends an identification command for requesting the communication module to respond with the communication module type stored in the communication module.

When the control unit determines that the communication module type of the communication module is not supported by the firmware set of the control unit, the control unit is configured to download firmware corresponding to the communication module type from the communication module.

Preferably, the communication module further includes a micro controller coupled to the second connector, and a signal receiving unit coupled to the micro controller. The signal receiving unit is adapted to receive the control command from the control terminal. The micro controller transforms a format of the control command received from the signal receiving unit into a signal format conforming to the first connector and the second connector prior to transmitting the control command to the second connector.

Preferably, the signal format is an $I^2C$ signal format, and the first connector and the second connector are $I^2C$ interfaces.

Preferably, the communication module is selected from an infrared communication module, a Zigbee communication module, a Digital Addressable Lighting Interface (DALI) communication module, and a power line communication module.

Preferably, the light-emitting module is a light-emitting diode module including a plurality of light-emitting diodes.

Preferably, the lamp device further includes a housing that receives the driving circuit, the control unit and the first connector, and that has an opening aligned with the first connector. The communication module is disposed in the housing via the opening to couple electrically the first and second connectors. The housing further has a cover disposed at the opening for concealing the communication module in the housing.

BRIEF DESCRIPTION OF THE DRAWINGS

Other features and advantages of the present invention will become apparent in the fol lowing detailed description of the preferred embodiment with reference to the accompanying drawings, of which.

DETAILED DESCRIPTION OF THE PREFERRED EMBODIMENT

Figure 1:
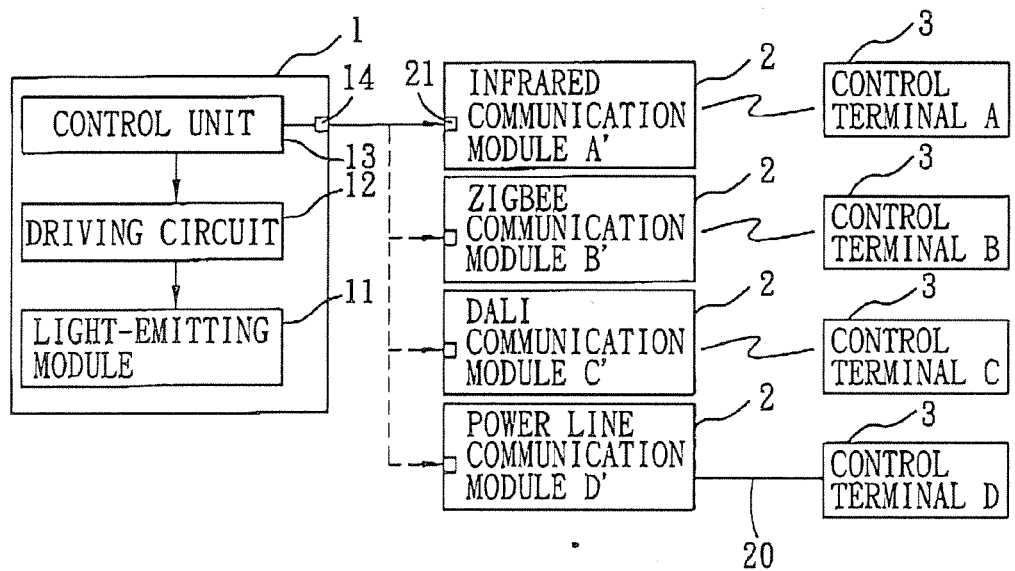
FIG. 1 is a block diagram illustrating a preferred embodiment of a lamp device of the present invention.
Figure 2:
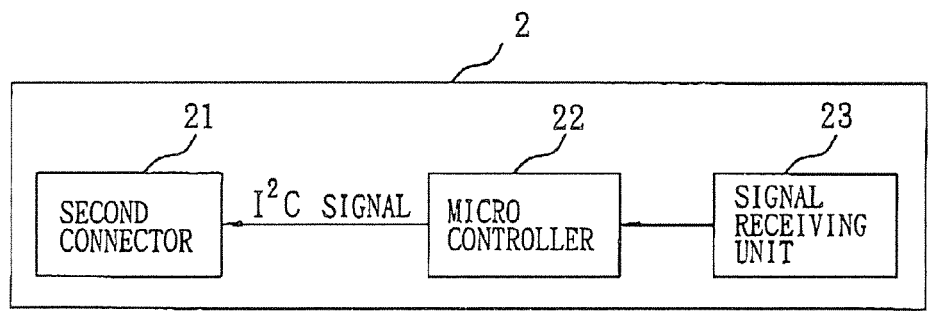
FIG. 2 is a block diagram illustrating a communication module of the preferred embodiment.

Referring to FIG. 1 and FIG. 2, a block diagram of a preferred embodiment of a lamp device 1 of the present invention is illustrated. The lamp device 1 is for pluggable and electrical connection to a communication module 2 so as to receive a control command from a control terminal 3 through the communication module 2. The lamp device 1 includes a light-emitting module 11, a driving circuit 12 electrically coupled to the light-emitting module 11 for driving the light-emitting module 11, a control unit 13 electrically coupled to the driving circuit 12 for controlling duty cycle of the driving circuit 12, and a first connector 14.

In this embodiment, the light-emitting module 11 is a light-emitting diode module including a plurality of light-emitting diodes, but is not limited to the disclosure herein. The driving circuit 12 is a pulse-width modulation driving circuit and is electrically coupled to the light-emitting module 11. The driving circuit 12 adjusts duty cycle thereof for driving the light-emitting module 11 in accordance with a pulse-width modulation signal, so as to control luminance or color temperature of the light-emitting module 11. The control unit 13 is electrically coupled to the driving circuit 12, and outputs the pulse-width modulation signal for controlling duty cycle of the driving circuit 12. The first connector 14 is electrically coupled to the control unit 13 so as to transmit the control command from the control terminal 3 to the control unit 13.

The communication module 2 is pluggably and electrically coupled to the lamp device 1. The communication module 2 includes a second connector 21 pluggably coupled to the first connector 14, a micro controller 22 coupled to the second connector 21, and a signal receiving unit 23 coupled to the micro controller 22. The signal receiving unit 23 is adapted to receive the control command from the control terminal 3. In this embodiment, the first connector 14 and the second connector 21 are I²C interfaces. Therefore, the micro controller 22 transforms a format of the control command received from the signal receiving unit 23 into a I²C signal format conforming to the first connector 14 and the second connector 21 prior to transmitting the control command to the second connector 21. The micro controller 22 of the communication module 2 stores a communication module type to which the communication module 2 belongs and a firmware corresponding to the communication module type stored in the communication module 2. The firmware includes instructions for executing the control command so as to generate the pulse-width modulation signal for controlling the driving circuit 12.

In this embodiment, the communication module 2 may belong to different communication module types (such as infrared, Zigbee, DALI, and power line) for matching different communication protocols used by the control terminal 3. Referring to FIG. 1, if a control terminal A transmits a control command through infrared, the communication module 2 matched with the control terminal A is an infrared communication module A'. If a control terminal B transmits a control command through Zigbee technology, the communication module 2 matched with the control terminal B is a Zigbee communication module If a control terminal C transmits a control command through Digital Addressable Lighting Interface (DALI) technology, the communication module 2 matched with the control terminal C is a DALI communication module C'. Further, the communication module 2 may be a power line communication module D' which communicates with a control terminal D through a power line 20. Specifically, the signal receiving unit 23 in each of the infrared communication module A', the Zigbee communication module B' and the DALT communication module C' includes an antenna and a demodulation circuit (not shown), and each of the control terminal A, the control terminal B and the control terminal C is a remote controller. The signal receiving unit 23 of the power line communication module D' is a coupler coupled to the power line 20, and the control terminal D controls the lamp device 1 through the power line 20.

In an aspect of the lamp device 1, for compatibility with different communication modules 2, the control unit 13 is configured with a firmware set corresponding to different communication module types (for example, the infrared communication module A' and the Zigbee communication module B'). A firmware in the firmware set corresponds to the communication module type to which the communication module 2 belongs and includes instructions for executing the control command so as to generate the pulse-width modulation signal for controlling the driving circuit 12.

Figure 3:
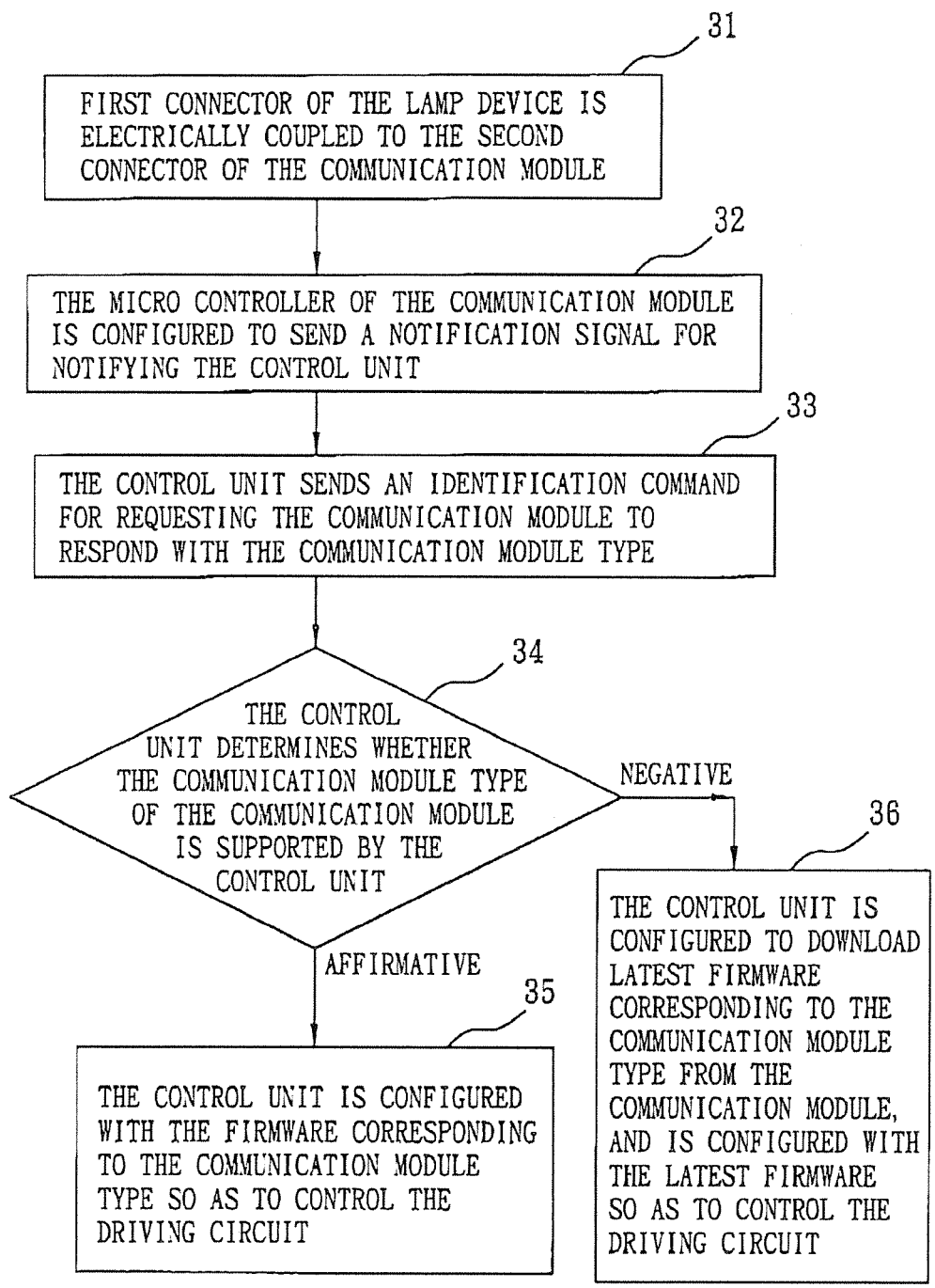
FIG. 3 is a flow chart of the preferred embodiment illustrating an interactive process between the lamp device and the communication module when the communication module is pluggably coupled to the lamp device.

Referring to FIG. 3, a flow chart illustrates an interactive process between the lamp device 1 and the communication module 2 when the communication module 2 is pluggably coupled to the lamp device 1. In step 31, the first connector 14 of the lamp device 1 is electrically coupled to the second connector 21 of the communication module 2. In step 32, the micro controller 22 of the communication module 2 is configured to send a notification signal for notifying the control unit 13. In step 33, the control unit 13 sends an identification command for requesting the communication module 2 to respond with the communication module type to which the communication module 2 belongs. In step 34, the control unit 13 determines whether the communication module type of the communication module 2 is supported by the control unit 13. If result of the determination is affirmative (i.e., the communication module 2 is one of the infrared communication module A' and the Zigbee communication module B'), step 35 is performed. In step 35, the control unit 13 is configured with the firmware corresponding to the communication module type to which the communication module 2 belongs so as to control the driving circuit 12. If the result of the determination is negative (i.e., the communication module 2 is not one of the infrared communication module A' and the Zigbee communication module 2', such as the DALI communication module C'), step 36 is performed. In step 36, the control unit 13 is configured to download latest firmware corresponding to the communication module type from the micro controller 22 of the communication module 2 (i.e., the DALI communication module C'), and is configured with the latest firmware which includes instructions for executing the control command so as to control the driving circuit 12.

Figure 4:
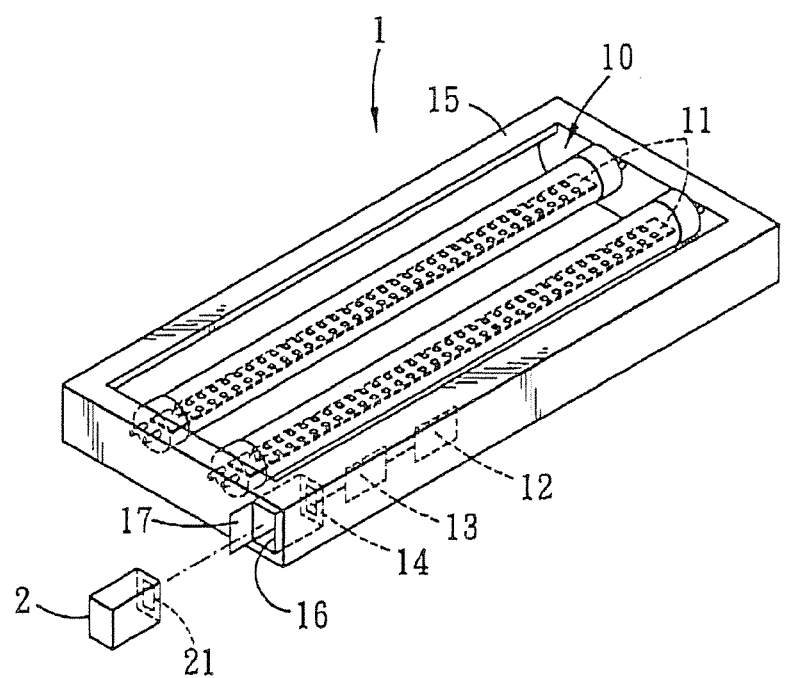
FIG. 4 is a perspective view of the lamp device of the preferred embodiment.

Furthermore, referring to FIG. 4, a perspective view of the lamp device 1 of the preferred embodiment is illustrated. The lamp device 1 further includes a housing 15 that receives the driving circuit 12, the control unit 13 and the first connector 14, and that has a surface with a recessed area 10 within which the light-emitting module 11 is mounted. In this embodiment, the light-emitting module is a pair of light-emitting diode modules as shown in FIG. 4, but is not limited to the disclosure herein. The light-emitting module 11 may be a single light-emitting diode module or more than two light-emitting diode modules, and disposition of the light-emitting diodes (LED) in each of the light-emitting diode modules is not limited to longitudinal formation and may be circular formation or any other formations. The housing 15 further has an opening 16 aligned with the first connector 14, such that the first connector 14 received in the housing 15 may be accessible from an exterior of the housing 15. The communication module 2 is disposed in the housing 15 via the opening 16 to couple electrically the second connector 21 with the first connector 14. The housing 15 further has a cover 17 disposed at the opening 16 for concealing the communication module 2 in the housing 15, such that the communication module 2 may be protected from moisture and dust. Moreover, an appearance of the housing 15 shown in FIG. 4 is merely an illustrative example, and should not be limited to the disclosure herein. In practice, the lamp device 1 in this embodiment may not only be applied in interior illumination, but also be applied to traffic lights and outdoor warning lamps.

In summary, in the preferred embodiment, the lamp device 1 and the communication module 2 may be pluggably coupled to each other, such that when a user wants to replace communication protocol of the control terminal 3, the user only needs to replace the communication module 2 individually without replacing the communication module 2 together with the lamp device 1. In this way, expense may be saved, and an effect of environmental protection may be achieved. Furthermore, the lamp device 1 is capable of automatically identifying the communication module type of the communication module 2 coupled thereto, and updating firmware if the communication module 2 is not supported by the current firmware set of the lamp device 1. In this way, the lamp device 1 may be compatible with different communication modules 2, and the communication module 2 may be replaced with relative ease.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lamp device controllable by a control terminal, said lamp device comprising:
   a light-emitting module;
   a driving circuit electrically coupled to said light-emitting module for driving said light-emitting module;
   a control unit electrically coupled to said driving circuit for controlling duty cycle of said driving circuit;
   a first connector electrically coupled to said control unit; and
   a communication module including a second connector pluggably coupled to said first connector, said communication module being adapted to receive a control command from the control terminal and transmitting the control command to said control unit via said first and second connectors, such that said control unit controls said driving circuit in accordance with the control command, said communication module storing a communication module type to which said communication module belongs and a firmware corresponding to the communication module type stored in said communication module, said firmware including instructions for executing the control command so as to generate a pulse-width modulation signal for controlling said driving circuit;
   wherein said control unit is configured with a firmware set corresponding to different communication module types;
   wherein when said second connector of said communication module is electrically coupled to said first connector, said communication module is configured to send a notification signal for notifying said control unit, and said control unit sends an identification command for requesting said communication module to respond with the communication module type stored in said communication module; and
   wherein when said control unit determines that the communication module type of said communication module is not supported by said firmware set of said control unit, said control unit is configured to download firmware corresponding to the communication module type from said communication module.

2. The lamp device as claimed in claim 1, wherein said communication module further includes a micro controller coupled to said second connector, and a signal receiving unit coupled to said micro controller, said signal receiving unit being adapted to receive the control command from the control terminal, said micro controller transforming a format of the control command received from said signal receiving unit into a signal format conforming to said first connector and said second connector prior to transmitting the control command to said second connector.

3. The lamp device as claimed in claim 1, wherein said light-emitting module is a light-emitting diode module including a plurality of light-emitting diodes.

4. The lamp device as claimed in claim 1, further comprising a housing that receives said driving circuit, said control unit and said first connector, and that has an opening aligned with said first connector,
   said communication module being disposed in said housing via said opening to couple electrically said first and second connectors,
   said housing further having a cover disposed at said opening for concealing said communication module in said housing.

5. A lamp device for pluggable and electrical connection to a communication module so as to receive a control command from a control terminal through the communication module, said lamp device comprising:
   a light-emitting module;
   a driving circuit electrically coupled to said light-emitting module for driving said light-emitting module;
   a control unit electrically coupled to said driving circuit for controlling duty cycle of said driving circuit; and
   a first connector electrically coupled to said control unit, and pluggably coupled to a second connector of the communication module so as to receive the control command from the control terminal through the communication module and to transmit the control command to said control unit, such that said control unit controls said driving circuit in accordance with the control command;
   wherein when said first connector is electrically coupled to the second connector of the communication module, said control unit is configured to receive a notification signal from the communication module via said first connector, and to send an identification command for requesting the communication module to respond with a communication module type to which the communication module belongs, and
   wherein when said control unit determines that the communication module type of the communication module is not supported by said control unit, said control unit is configured to download firmware corresponding to the communication module type from the communication module.

6. The lamp device as claimed in claim 5, wherein said control unit is configured with a firmware set corresponding to different communication module types, a firmware in said firmware set corresponding to the communication module type to which the communication module belongs and including instructions for executing the control command so as to generate a pulse-width modulation signal for controlling said driving circuit.

7. The lamp device as claimed in claim 5, wherein said light-emitting module is a light-emitting diode module including a plurality of light-emitting diodes.

8. The lamp device as claimed in claim 5, further comprising a housing that receives said driving circuit, said control unit and said first connector, and that has a surface with a recessed area within which said light-emitting module is mounted, said housing further having an opening aligned with said first connector, the communication module being disposed in said housing via said opening to couple electrically the second connector with said first connector, said housing further having a cover disposed at said opening for concealing the communication module in said housing.

9. A lamp device for pluggable and electrical connection to a communication module so as to receive a control command from a control terminal through the communication module, said lamp device comprising:

a light-emitting module;

a driving circuit electrically coupled to said light-emitting module for driving said light-emitting module;

a control unit electrically coupled to said driving circuit for controlling duty cycle of said driving circuit;

a first connector electrically coupled to said control unit, and pluggably coupled to a second connector of the communication module so as to receive the control command from the control terminal through the communication module and to transmit the control command to said control unit, such that said control unit controls said driving circuit in accordance with the control command; and a housing that receives said driving circuit, said control unit and said first connector, and that has a surface with a recessed area within which said light-emitting module is mounted, said housing further having an opening aligned with said first connector, the communication module being disposed in said housing via said opening to couple electrically the second connector with said first connector, said housing further having a cover disposed at said opening for concealing the communication module in said housing.

10. The lamp device as claimed in claim 9, wherein said control unit is configured with a firmware set corresponding to different communication module types, a firmware in said firmware set corresponding to the communication module type to which the communication module belongs and including instructions for executing the control command so as to generate a pulse-width modulation signal for controlling said driving circuit.

11. The lamp device as claimed in claim 9, wherein said light-emitting module is a light-emitting diode module including a plurality of light-emitting diodes.

* * * * *